United States Patent [19]

Berry et al.

[11] Patent Number: 4,997,249
[45] Date of Patent: Mar. 5, 1991

[54] VARIABLE WEIGHT FIBER OPTIC TRANSVERSAL FILTER

[75] Inventors: Mark H. Berry, El Cajon; Debra M. Gookin, San Diego, both of Calif.

[73] Assignee: The United States of America as represented by the Secretary of the Navy, Washington, D.C.

[21] Appl. No.: 486,622

[22] Filed: Feb. 26, 1990

[51] Int. Cl.⁵ .......................... G02B 6/26; G02F 1/00
[52] U.S. Cl. ........................ 350/96.15; 350/96.11; 350/96.16; 350/311; 455/612; 455/613
[58] Field of Search .............. 350/96.11, 96.12, 96.13, 350/96.14, 96.15, 96.16, 96.29, 96.30, 311; 455/605, 606, 607, 610, 609, 612, 613

[56] References Cited

U.S. PATENT DOCUMENTS

| | | | |
|---|---|---|---|
| H474 | 6/1988 | Taylor | 350/96.19 |
| 4,128,759 | 12/1978 | Hunt et al. | 350/96.13 X |
| 4,159,418 | 6/1979 | Marom | 350/96.16 |
| 4,473,270 | 9/1984 | Shaw | 350/96.15 |
| 4,493,528 | 1/1985 | Shaw et al. | 350/96.15 |
| 4,514,821 | 4/1985 | Tower | 364/862 |
| 4,588,255 | 5/1986 | Tur et al. | 350/96.16 |
| 4,671,605 | 6/1987 | Soref | 350/96.15 |
| 4,702,550 | 10/1987 | Sano | 350/96.16 |
| 4,784,453 | 11/1988 | Shaw et al. | 350/96.16 |
| 4,810,052 | 3/1989 | Fling | 350/96.16 |
| 4,859,019 | 8/1989 | Bevan | 350/96.16 |
| 4,910,726 | 3/1990 | Stanley | 370/3 |

*Primary Examiner*—Brian Healy
*Attorney, Agent, or Firm*—Harvey Fendelman; Thomas G. Keough

[57] ABSTRACT

A transversal filter uses optical components to provide for a wide bandwidth, greater than 10 GHz signal processing capability. rf modulated optical signals are fed over different lengths of optical fibers to impart appropriate tap delays and each is coupled to an integrated optical coupler. Each of the integrated optical couplers have the capability to introduce variable positive and negative weights. Incoherent summing means receive the modulated signals and feed them to an interconnected detector to thereby provide appropriate positive and negative variable weighted signals.

7 Claims, 7 Drawing Sheets

4,997,249

VARIABLE WEIGHT FIBER OPTIC TRANSVERSAL FILTER

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Transversal filter functions generally are performed electronically using computers and specialized integrated circuits. The maximum signal bandwidth electronic filters can handle is about 100 MHz. Later developed, electronic tapped delay lines rely on surface acoustic wave devices and charge coupled devices or active charge transport devices. These later devices are limited to bandwidths of about 1 GHz or less and are not reconfigurable. Optical tapped delay-line filters have been fabricated with fixed delays and fixed tap weights. The fiber optic transversal filters have demonstrated capabilities of up to 15 GHz bandwidths (limiting factor varies) but they have fixed (not always, but mostly, unity) tap weights and are not reconfigurable.

The fiber optic transversal filters can handle higher bandwidth signals and faster tap weight update rates than any electronic computing technology. The improvement over other optical techniques is that the filter is reconfigurable. Such a fiber optic delay-line filter is shown in the U.S. Pat. No. 4,128,759 issued to Barry R. Hunt et al. Variable weighted taps in the range of 0 to +1 are operatively associated with different lengths of optical fibers to provide an electrical output signal which is a function of the sum of the incident light energy signals. As a consequence, higher bandwidth data may be processed than was previously possible and several filtering functions are conceivable such as beam forming. Independently, operative attenuators provide only a positive weighting which selectively varies the positive amplitude of the light energy signals propagating through each of the fiber optic delay-lines.

Thus a continuing need exists in the state of the art for an optical transversal filter having variable positive and negative weight capability which assures a large bandwidth (approximately 10) GHz processing capability.

SUMMARY OF THE INVENTION

The present invention is directing to providing a positive and negative variable weight fiber optic transversal filter relying on optical components to provide for a wide bandwidth signal processing capability. A source of optical signals is I modulated by an electrical or optical signal of interest and sent through a plurality of optical fibers of different lengths. Each of the fibers is connected to an integrated optical coupler (IOC) selectively controlled by bias and rf signals to provide positive and negative tap weights for the modulated optical signals (depending on the configuration of associated components that are selected). At least one summer is operatively connected to receive the outputs of the integrated optical couplers and feeds the composite signal to a photodetector which transforms the optical signal energy into electronic signals for appropriate further processing.

An object of the invention is to provide an optical transversal filter having variable, positive and negative weights.

Another object is to provide an optical transversal filter in which negative weights are implemented by inverting the phase of an rf signal in a particular tap.

Yet another object is to provide an optical transversal filter with variable positive and negative tap weights having the capability to process large bandwidths of approximately 10 GHz analog electrical or optical signals.

These and other objects of the invention will become more readily apparent from the ensuing specifications, drawings and claims.

DESCRIPTION OF THE PREFERRED EMBODIMENT

Figure 1:
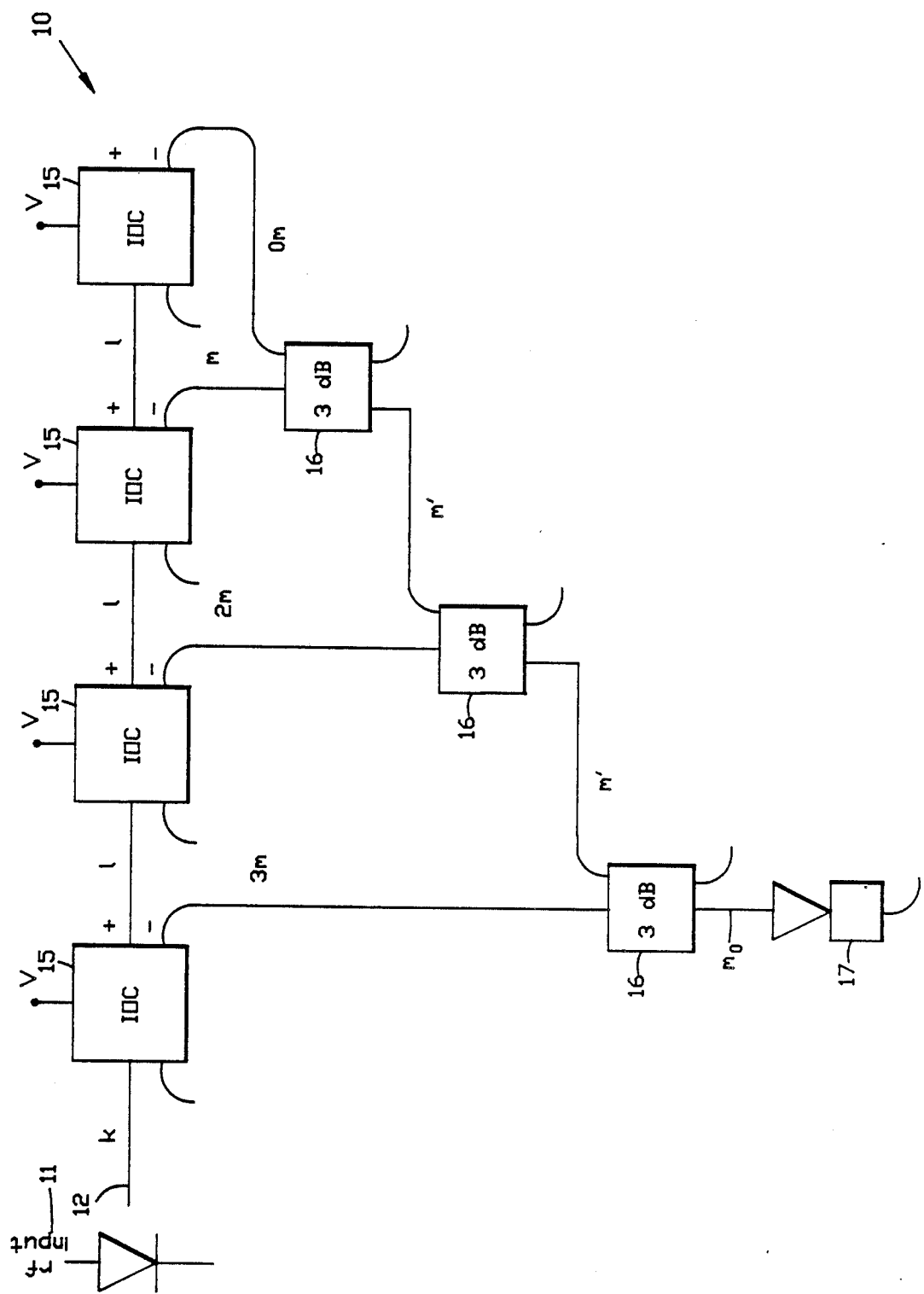
FIG. 1 shows a representative embodiment of a transversal filter fabricated in accordance with this inventive concept.
Figure 4:
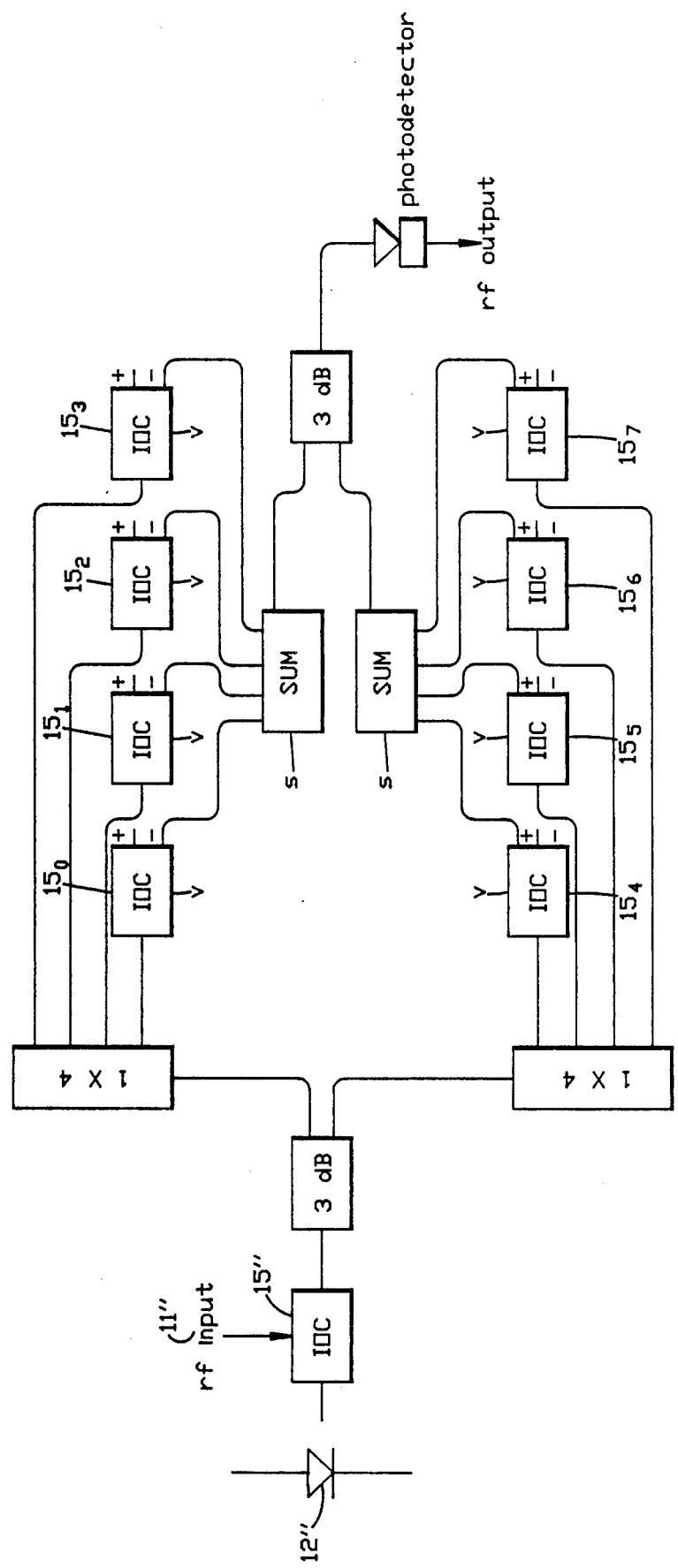
FIG. 4 depicts an 8 tap fiber optic finite impulse response filter with variable taps.

Referring now to FIG. 1 of the drawings, an optical transversal filter 10 is configured to provide a much higher throughput and, consequently, increased efficiency of processing the useful information of an rf input signal 11. The rf input signal can be provided for by direct modulation of a laser diode 12, although for some applications this may not be the most suitable modulation technique since direct modulation of a diode may produce objectional levels of frequency dependent noise that can reduce the dynamic range of the filter response. Partially, for that reason, another embodiment of this inventive concept in FIG. 4 shows a preferred optional modulation technique which is to modulate the light externally using an integrated optical coupler to avoid the creation of undue levels of noise. Also, the use of the integrated optical coupler as an external modulator provides for the additional capability of using positive and negative tap weights. This technique will be elaborated on with respect to embodiment of FIG. 4 below.

Whichever modulation approach is relied upon, the modulated signal is optically coupled into a length k of an optical fiber in accordance with appropriate coupling techniques. The modulated optical signal from fiber k is fed to a series of integrated optical couplers 15 which are also referred to as optical two-by-two switches.

The integrated optical couplers serve as filter tap weights and, when it is noted that each are separated one from the other by a length 1 of optical fiber, a tap delay-line capability is provided. The integrated optical couplers here are used as variable tap weights with the capability to be used as positive and negative tap weights in a manner to be discussed below.

Integrated optical couplers are well-known in the art and are commercially available from a number of sources. Typically, an integrated optical coupled could be model Y-35-5370 or Y-35-5600 IOC's of Hoechst Celanese Advanced Photonics that are manufactured by GEC Research Ltd. of England or the OGC 2×2 Switch marketed by Crystal Technology Inc. of Palo Alto, Calif., as their Models SW385P, SW313P and SW315P although other models by other manufactures could be selected as well without departing from the scope of this inventive concept.

Other off-the-shelf integrated optical couplers might be selected which have bandwidths up to 10 GHz and state-of-the-art integrated optical couplers could be chosen that have bandwidths greater than 20 GHz. The integrated optical couplers of the different manufacturers all, to one degree or another, have different characteristics.

To realize the advantages of this inventive concept, however, the integrated optical couplers selected have a raised cosine response characteristic. Another suitable integrated optical coupler having a useful response characteristic is known as the delta beta couplers in which there is a different functional response. Yet, in both cases there is a positive slope response portion of the response curve and a negative slope response portion of the response curve and the operation point on that response curve is determined by an applied external voltage. If either of these integrated optical couplers, or other couplers not specifically discussed herein, were to be used, as long as it had this characteristic of having positive or negative slope portion responses with a quasilinear region on both slopes, it could be suitably employed in place of IOCs that are being discussed.

In FIG. 1 the intensity of the rf modulated optical signals over fibers 1 versus the intensity of the optical signals sent to summing optical detector 17 is a function of a voltage "v" coupled to each integrated optical coupler 15. The voltage at each IOC can be independently controlled, the magnitude of the voltage determines the weight of the signal in the tapped fiber. The tap weight signals from each integrated optical coupler 15 over fibers om to 3 m is collected by the coupler 16 which may be star couplers, 3 dB couplers or other suitable low loss fiber optic couplers. The collected signals fed through detector 17 is the incoherent sum of the optical intensities from each tap, integrated optical coupler 15.

In other words, the electrical output at detector 17 is the electrical input signal 11 modified by the transversal filter 10. The positive and negative tap weights provided by voltage v are predetermined in advance or adapted during the filtering process (adaptive filter and neural computing applications). The tap weights (voltages v) can be controlled using 0–5 volt signals and updated at rates in excess of 3 GHz using off-the-shelf integrated optical couplers.

The FIG. 1 configuration described refers to only four serially connected integrated optical couplers and their associated components. This arrangement was selected and was restricted to such a number only for the purpose of demonstration.

A particular processing application may require that the filter length be hundreds or more elements long. In such a case, however, it is likely to be advantageous to avoid deterioration of the modulated laser signal in the long filter and additional laser diodes could be modulated in parallel with the first laser diode and the signal from each laser diode fed (with appropriate delays) into separate sections of a filter.

A very practical way to increase the number of taps and still get a fairly large signal to noise ratio is by putting the signal into the filter in parallel sections. The separate filter sections are operating in parallel with different delays associated with each filter. Problems associated with the dynamic range and the light intensity are within the purview of one skilled in the art so that appropriate signals eventually come together and arrive at one detector.

Figure 2:
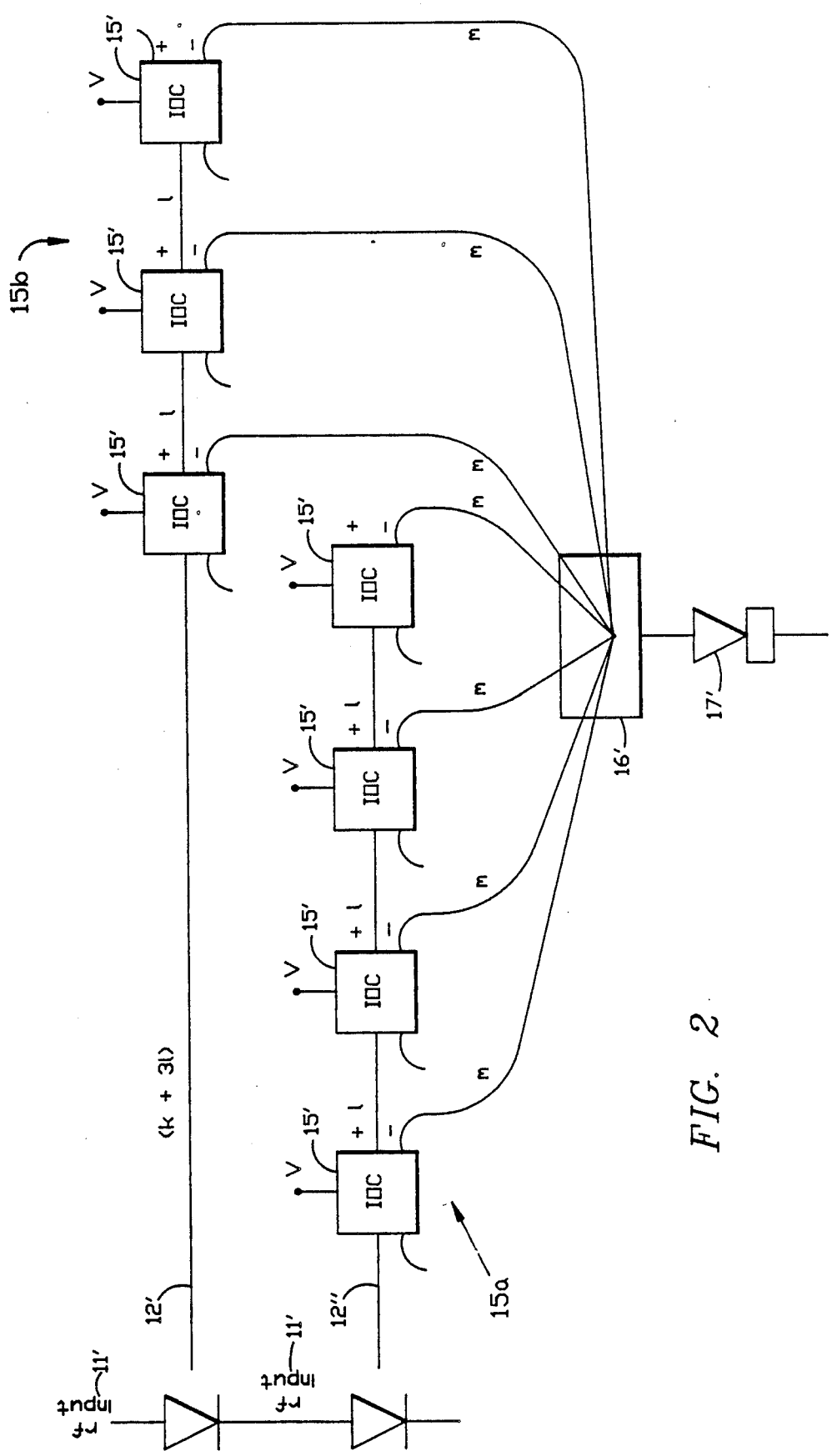
FIG. 2 shows another embodiment of this transversal filter innovative concept.

A schematic, demonstrative arrangement for this capability is set out in FIG. 2 which, like FIG. 1, shows a filter implementation with only a single sign of weight. A pair of laser diodes 12' and 12" are each modulated by rf input 11'. A section 15a of integrated optical couplers 15' associated with laser diode 12" receive in-phase modulated optical signals from fiber lengths k and 1 in a manner like that referred to above.

Another section 15b of the filter includes the integrated optical coupler 15' associated with laser diode 12'. The serially connected integrated optical couplers of section 15b are optically interconnected to laser diode 12' by a length of optical fiber equal to lengths k plus 31 and individual integrated optical couplers are separated one from the other in section 15b by lengths 1 of the optical fiber.

These two sections are coupled together through one or more coupling stages, one such stage 16' being shown in FIG. 2, and still be summed therein for detector 17'

Obviously, additional sections of the filter could be provided, each with its own modulated laser diode with an interconnecting, appropriate length of fiber, so that very long filters having many sections of taps could be implemented. More weight could be implemented or more taps could be implemented on a single filter. A filter length is an important characteristic in determining the response behavior of the filter, and so it is a concern to know how many tap weights there could be on a filter. A typical digital filter has lengths of several hundred taps. Of course, those digital filters are operating at very low sampling frequencies when compared to this one.

For example, digital filters often operate at about a MHz sampling frequency, but the filter technology of this inventive concept uses GHz sampling rates. Thus, the filter length using the technology of FIGS. 1 and 2 is going to be limited to a smaller number of taps than that currently available with some digital technology approaches since the limiting factor is the signal to noise ratio at the detector The depictions of FIGS. 1 and 2 as well as FIGS. 4, 7, and 8 to follow have been depicted as containing lengths of fibers and discrete components. Obviously this configuration could be improved by fabricating the integrated optical couplers, the 3 dB couplers and waveguides which replace the optical fibers from a single substrate (LiNbO$_3$ for example). Such convenient packaging technique should increase reliability, reduce costs, and can be routinely fabricated in accordance with current technology. These techniques should reduce losses with increased signal to noise ratios and allow for smaller spacing between switches and hence higher sampling rates.

Figure 3:
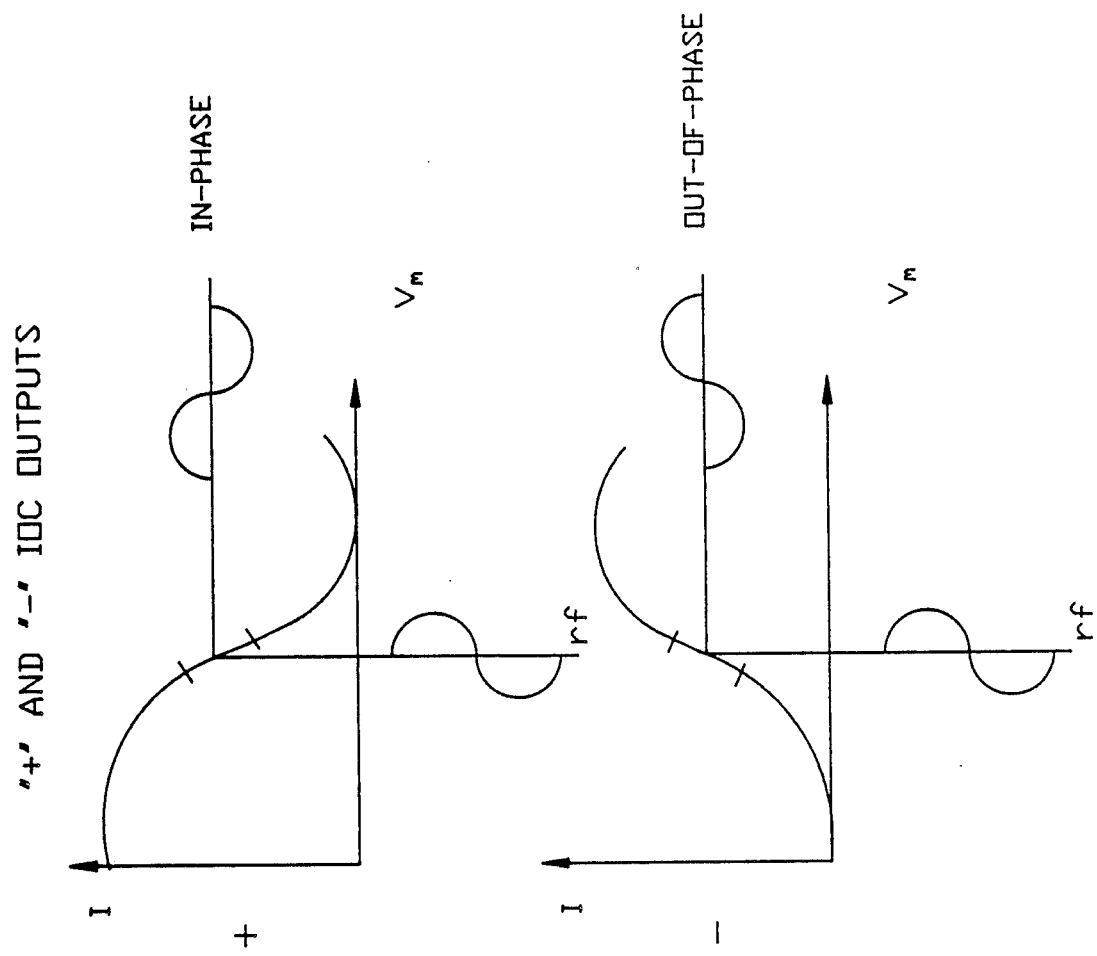
FIG. 3 is a representation of an IOC's positive slope response and negative slope responses that assures in-phase (positive) and out-of-phase (negative) tap weights.

Referring now to FIG. 3, the feature of attaining a variable weight filter with positive and negative weights is assured by a novel appreciation of the cosine response of the integrated optical coupler. As mentioned above, another suitable integrated optical coupler, the delta beta coupler has a useful response characteristic which exhibits a positive slope response portion of the response curve and a negative slope response portion of the response curve and the operation point on that response curve is determined by an applied external voltage. If these or other integrated optical couplers, that had this characteristic of having positive or negative slope portion responses with a quasilinear region on both slopes, were to be used, the positive and negative variable weighting factors could be created.

A positive tap weight in an IOC is one which does not change the phase of the output of the rf signal with respect to the input rf signal. The voltage on a positive tap weight IOC only changes the weight part or the amplitude of the signal. Whereas, a negative tap weight in an IOC causes the input rf signal to undergo 180 degree phase shift before it comes out of that tap.

FIG. 3 shows the cosine response of an integrated optical coupler. The operating point is changed for the inputted rf signal so that the intensity of the light responds to an applied voltage with cosine response. An integrated optical coupler, or modulator, may be biased to operate at a DC voltage which is in the linear region of the cosine function response. Then, modulated rf signals are applied to the electrical input of the coupler and achieve a linear modulation in the intensity of the light that is passing through the IOC. By merely changing the DC bias voltage or operating point, the positive or negative part of cosine response function curve of the IOC is presented to the electrical signal to create either an in-phase or an out-of-phase response optical intensity response to the electrical rf signal.

The curves to the right in FIG. 3 represent the intensity that comes out of each of the two IOC outputs "+" and "−". Thus, on each IOC there is a positive phase output and a negative phase output and each of these curves shows how the intensity of the light varies with the same voltage modulation. However, it is possible to increase the bias voltage so that the magnitude of the applied signal causes the IOC to ride up on the other side of the cosine response curve. This would create a negative phase output to appear at IOC output "+" and positive phase output to appear at IOC output "−".

A major advantage of this inventive concept over other optical filters is that both positive and negative tap weights at various intensity levels can be implemented on the same filter by the advantageous and novel employment of the inherent properties of the selected integrated optical couplers.

FIG. 4 depicts another variation of this inventive concept in which an optic finite impulse response filter is capable of processing large bandwidth signals with a large dynamic range. This filter has continuously variable, real, positive tap weights and can process up to a 10 GHz bandwidth analog electrical or optical signals. An integrated optical coupler 15" was used to externally modulate the optical signals coming from a cw 1.3 micron laser diode 12" with rf signals 11". The modulated light was split via a 3 dB coupler into a pair of 1×4 trees that distributed it into an array of optical fibers cut so that their differences in length resulted in 0.5 nanosecond delays. The delay corresponds to a 2 gigasample per sec sampling rate. Only one output of each IOC 15' was used for this operation and the intensity of each IOC was controlled by an applied DC voltage v. The appropriately weighted and delayed intensity modulated signals were collected by a pair of asymmetrical star couplers s and fed to an InGaAs avalanche photodetector.

A 0 to 2 GHz electrical signal (rf 11") was used to characterize the response of this transversal filter which has a dynamic range greater than 110 dB normalized to a 1 Hz noise bandwidth. Since the laser diode was modulated externally, the dynamic range was limited primarily by the detector range.

Figure 6:
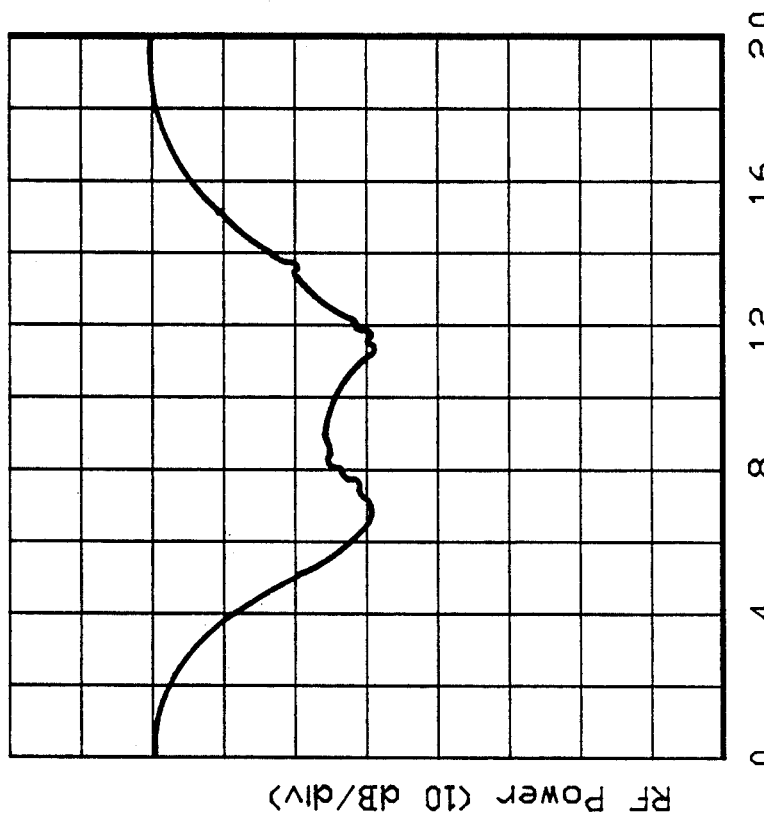
FIG. 6 shows the frequency response of the filter of FIG. 4 with tap weights $W_0 = 0$, $W_1 = 0.1$, $W_2 = 0.5$, $W_3 = 1.0$, $W_4 = 1.0$, $W_5 = 0.5$, $W_6 = 0.1$ and $W_7 = 0$.
Figure 5:
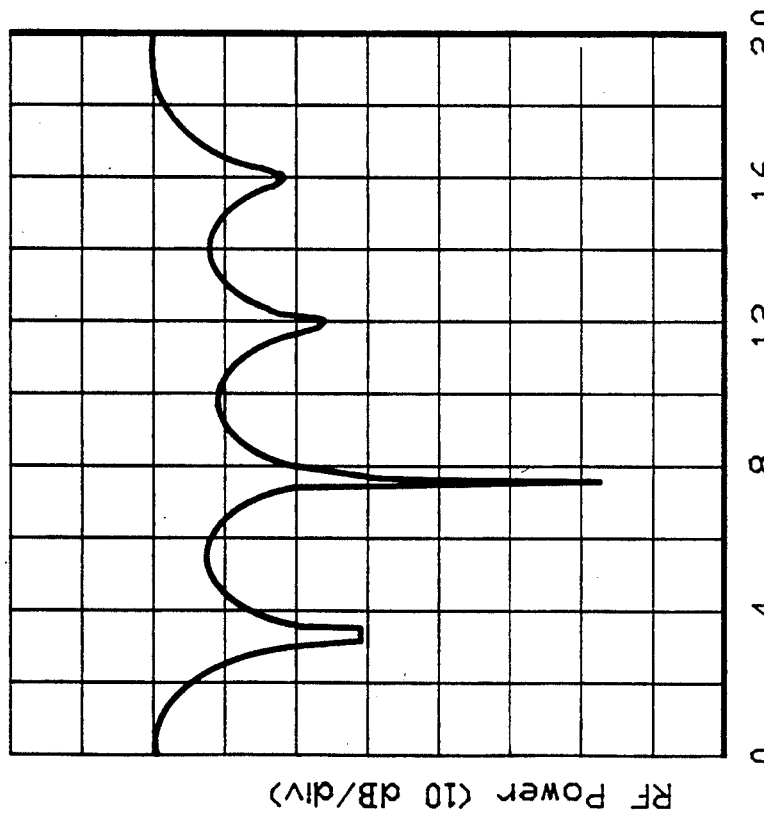
FIG. 5 shows the frequency response of the filter of FIG. 4 with tap weights $W_0$ to $W_3$ of IOCs $15_0$ to $15_3 = 1$ and $W_4$ to $W_7$ of IOCs $15_4$ to $15_7 = 0$.

Examples of the frequency response of the filter are shown in FIGS. 5 and 6. By changing the voltages v on the IOCs 15' light throughput from each tap was selectively attenuated. FIG. 5 shows the example of setting five of the tap weights to a value of one and the remaining tap weights were set to zero. FIG. 6 shows the response when the weighting functions for six equidistant taps was a raised cosine function. The variable weights also were used to perform null shifting.

Figure 7:
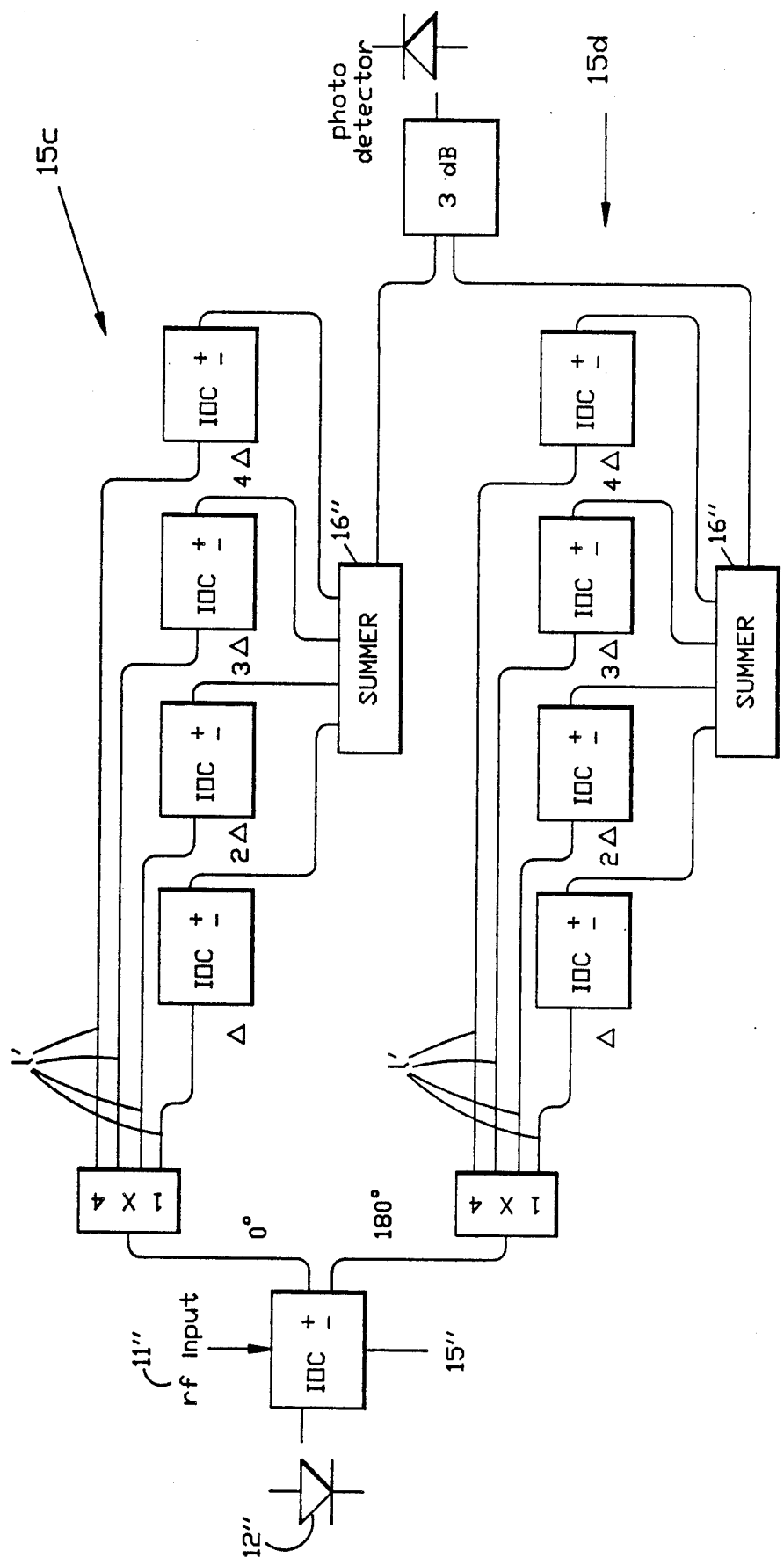
FIG. 7 is a representation of another embodiment of this inventive concept.

FIG. 7 demonstrates the capability of the integrated optical coupler when the 180 degree phase difference between the two outputs is utilized. Diode 12" is not modulated by rf signals 11" but instead the rf signal modulates the optical signals coming from diode 12" in IOC 15". Each of the two outputs "+" and "−" of an IOC 15" separately are fed an upper section 15c and a lower section 15d through two sets of individually, differently lengthened optical fibers 1'. The sets are preferably identical to impart relatively equal delays, but they may be tailored according to a desired response that may arise. Thus, section 15c is provided with a positive phase corresponding to positive weights and section 15d of the filter with a negative phase corresponding to negative weights. The appropriately weighted signals from the two sections are summed in suitable summers 16" and collected in a 3 dB coupler 16''' and coupled to a detector 17". In other words, the negative tap weights are implemented by using multiple filter inputs. One input signal for the upper 1×4 coupler is made by modulating the external modulator IOC 15" on its positive slope of the cosine response and the other (out-of-phase) signal for the lower 1×4 coupler is a function of the IOC's negative slope portion of the cosine response. The two signals pass through separate filter sections and are combined before or at the detector. The light signals are summed incoherently at the optical frequency and coherently at the rf frequency. The filter tap lengths 1' must be cut appropriately to achieve the desired degree of rf coherency.

Figure 8:
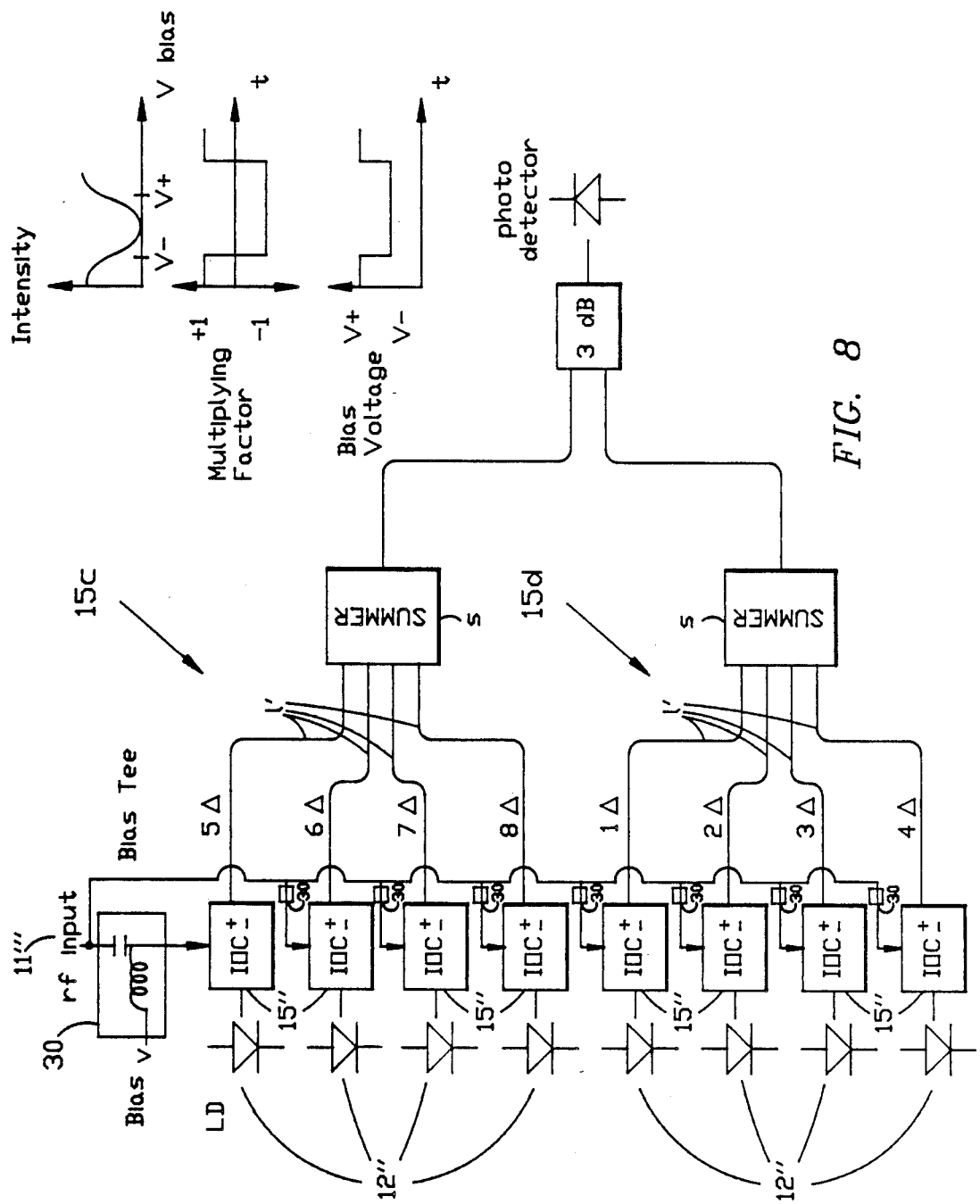
FIG. 8 shows still another embodiment of this inventive concept with graphical representations which depict the effect of different bias voltages.

In FIG. 8 a number of diodes 12" radiate optical signals to a like number of IOC's 15" that are modulated by a common rf signal 11''' or separate rf signals according to a processing operation. Individual bias voltages v are coupled to the IOC's 15" in accordance with a desired positive or negative slope operation via bias circuits 30 and a pair of summers 16" collect the signals from both IOC sections 15c and 15d for summers s which feed the collected signals to a 3 dB coupler and detector. This embodiment shows the use of DC bias voltages v in bias circuits 30 that shift the operating ranges of each IOC from, for example, $v_+$ to $v_-$ for each IOC 15", see the bias diagram associated with FIG. 8. This shift has the effect of providing the positive and negative signals that can include intensity variations in accordance with the magnitude of the rf signal and the multiplying factor of each IOC (which may be preset to effect a desired processing).

In FIGS. 4, 5 and 6 the laser diode intensity is not modulated. In fact, it is kept at a maximum intensity that can operate the filter or the laser at comfortably, in order to increase the dynamic range of the filter. The signal of interest is input to the filter at the places that are marked rf input on each of these two figures. In FIG. 4 there is only one rf input, and that is at the external modulator IOC 15″. In FIG. 8 each tap of each IOC 15″ of the filter has its own rf input 11‴ and this rf input arrives in parallel in each of these taps. From that point on in the filter the delays are set by the fiber length 1′ which are differently lengthened to induce the appropriate delays. Unlike the previous example, in this case the signs of the weights are set by the bias voltages on the IOCs, which determine the slope of the rf input. The amplitudes of the weights are set by the optical intensity from each laser diode. This intensity is controlled by setting the laser diode bias current.

The transversal filter fabricated in accordance with this inventive concept uses optical components to provide for a wideband single processing capability. Unlike other rf tapped delay-line filters, the transversal filter of this invention has variable, positive and negative weights. Heretofore, a limitation of conventional optical transversal filters was that they were not capable of weighting signals negatively simply because of the fact that light intensity cannot be subtracted.

This inventive concept demonstrates that it is not necessary to subtract light intensities to achieve a subtraction of one rf signal from another. This is accomplished by implementing negative weights by inverting the phase of the rf modulating optical signals in only one particular tap to accomplish negative weighting over the wide signal bandwidth. Merely adjusting the length of the fiber at each tap to change the delay is insufficient to achieve this. Changes in tap length result in a change of the frequency response of the filter, not in a change of the wideband phase response. A filter with only positive tap weights can only do low pass filtering and limited null steering.

Other operations can be performed by this invention on a signal by modifying the frequency and phase response of the transversal filter. A general theoretical finite impulse response filter can modify the frequency and phase response continuously, but all filters, analog or digital have some constraints. For example, the response of a typical digital filter can be modified within the limits imposed by the digitization (4 bits yields 90°/bit) and typical analog filters are limited to certain phase changes. This optical filter response can only provide a 0° to 180° phase shift in an input rf signal. Nevertheless, it can do most important filter operations such as phase encoding, signal time integration, unlimited null steering, matched filtering, pulse compression, waveform generation and differentiation. These operations have applications in radar and communications.

Obviously, many other modifications and variations of the present invention are possible in the light of the above teachings. It is therefore to be understood that within the scope of the appended claims the invention may be practiced otherwise than as specifically described.

We claim:

1. A transversal filter for processing optical signals modulated with an rf signal using optical components to provide positive and negative weights for a wideband signal comprising:
   an initial integrated optical coupler modulator having a response curve with at least one positive slope portion and at least one negative slope portion having a 0° shifted output and a 180° shifted output and being optically coupled to a source of said optical signals receiving said optical signals to modulate them with said rf signal;
   at first plurality of optical waveguides disposed to receive the rf signal modulated optical signals on the 0° shifted output each having a length to impart a discrete relative delay to the passage of said rf signal modulated optical signals therethrough;
   a second plurality of optical waveguides optically coupled in parallel with said first plurality of optical waveguides, each waveguide of which is disposed to receive the rf signal modulated optical signals on the 180° shifted output and each waveguide of which having a length to impart a discrete relative delay to the passage of said rf signal modulated optical signals therethrough and
   a separate integrated optical coupler being optically connected to each optical waveguide of said first plurality of optical waveguides and said second plurality of optical waveguides;
   at least one summer optically connected to an output of all of the separate integrated optical couplers; and
   a converter optically coupled to said summer to convert the output therefrom to representative electrical signals.

2. A transversal filter according to claim 1 further including:
   a potential source electrically coupled to each said separate integrated optical coupler to selectably shift the attenuation of each said integrated optical coupler connected to said first plurality of optical waveguides and connected to said second plurality of optical waveguides in accordance with the magnitude of the potential source.

3. A transversal filter according to claim 1 or 2 in which a separate said summer is optically coupled to separate integrated optical couplers connected to said first plurality of optical waveguides connected to receive the 0° shifted output and a separate said summer is optically coupled to the integrated optical couplers connected to said second plurality of optical waveguides to receive the 180° shifted output.

4. A transversal filter according to claim 3 in which a 3 dB coupler is connected to the two summers to combine their signals and feed them to a photodetector of said converter.

5. A transversal filter for processing optical signals modulated with an rf signal using optical components to provide positive and negative weights for a wideband signal comprising:
   a plurality of integrated optical coupler modulators each having a response curve with at least one positive slope portion and at least one negative slope portion for providing a 0° shifted output and a 180° shifted output and each being optically coupled to a source of said optical signals receiving said optical signals to modulate them with said rf signal;

a potential source electrically coupled to each of said integrated optical coupler modulators to selectably shift the response of each of said integrated optical coupler modulators to said positive slope portion or said negative slope portion in accordance with the magnitude of said potential source;

at first plurality of optical waveguides disposed to receive the rf signal modulated optical signals on the to shifted output each having a length to impart a discrete relative delay to the passage of said rf signal modulated optical signals therethrough;

a second plurality of optical waveguides optically coupled in parallel with said first plurality of optical waveguides, each waveguide of which is disposed to receive the rf signal modulated optical signals on the 180° shifted output and each waveguide of which having a length to impart a discrete relative delay to the passage of said rf signal modulated optical signals therethrough and at least one summer optically connected to said first plurality of optical waveguides and said second plurality of optical waveguides; and a converter optically coupled to said summer to convert the output therefrom to representative electrical signals.

6. A transversal filter according to claim 1 or 5 being specifically tailored to perform phase encoding, signal time integration, unlimited null steering, matched filtering, pulse compression, waveform generation and differentiation.

7. A transversal filter according to claim 3 being specifically tailored to perform phase encoding, signal time integration, unlimited null steering, matched filtering, pulse compression, waveform generating and differentiation.

* * * * *